(12) United States Patent
Panas (10) Patent No.: US 9,157,476 B2
(45) Date of Patent: Oct. 13, 2015

(54) UNDERCONSTRAINT ELIMINATOR MECHANISM IN DOUBLE PARALLELOGRAM LINEAR FLEXURE BEARING

(71) Applicant: Massachusetts Institute of Technology, Cambridge, MA (US)

(72) Inventor: Robert M. Panas, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 216 days.

(21) Appl. No.: 13/930,110

(22) Filed: Jun. 28, 2013

(65) Prior Publication Data

US 2015/0003759 A1    Jan. 1, 2015

(51) Int. Cl.
*F16F 1/00* (2006.01)
*F16C 29/00* (2006.01)
*F16C 43/00* (2006.01)

(52) U.S. Cl.
CPC .............. *F16C 29/002* (2013.01); *F16C 43/00* (2013.01); *Y10T 29/49641* (2015.01)

(58) Field of Classification Search
CPC . Y10T 29/49641; F16C 43/00; F16C 29/002; F16F 1/00
USPC ..................... 384/7; 267/158–160; 29/898.03
See application file for complete search history.

(56) References Cited

U.S. PATENT DOCUMENTS

| 6,059,481 A | 5/2000 | Genequand |
| 7,550,880 B1 | 6/2009 | Pusl |
| 7,884,525 B2 * | 2/2011 | Culpepper et al. ............ 310/309 |
| 8,210,840 B2 | 7/2012 | Shipickandula et al. |
| 2007/0118593 A1 | 5/2007 | McCaslin et al. |
| 2009/0260213 A1 * | 10/2009 | Shilpiekandula et al. ...... 29/428 |
| 2013/0207328 A1 * | 8/2013 | Awtar et al. .................... 267/160 |

OTHER PUBLICATIONS

Hopkins J.B., Culpepper M.L.; Sysnthesis of multi-degree of freedom, parallel flexure system concepts via Freedom and Constraint Topology (FACT)—Part I: Principles. Precision Engineering 2010; 34: 2: pp. 259-270.

Hopkins J.B., Culpepper M.L.; Synthesis of multi-degree of freedom, parallel flexure system concepts via freedom and constraint topology (FACT)—Part II: Practice. Precision Engineering 2010; 34: 2: pp. 271-278.

(Continued)

*Primary Examiner* — Christopher Schwartz
(74) *Attorney, Agent, or Firm* — Davis, Malm & D'Agostine, P.C.

(57) ABSTRACT

A double parallelogram linear flexural system and method includes a first stage extending in a direction of movement, and a pair of parallelogram flexures extending from the first stage to distal ends configured for being grounded. A second stage extends parallel to the first stage, with another pair of parallelogram flexures extending between the stages, wherein the stages and parallelogram flexures form a double parallelogram. A linkage is disposed between, and resiliently coupled to, the stages. Linkage guiding flexures extend divergently from the linkage, to distal end portions configured for being grounded. The linkage guiding flexures define a notional triangle having a base extending between the distal end portions, and sides extending through proximal end portions to a notional apex defining a center of rotation for the linkage. The linkage is entirely within the double parallelogram, while constraining the stages to oscillate at the same frequency and phase.

19 Claims, 7 Drawing Sheets

(56) References Cited

OTHER PUBLICATIONS

Panas R.M, Cullinan M.A., Culpepper M.L.; Design of piezoresistive-based MEMS sensor systems for precision microsystems.; Precision Engineering 2012; 36: pp. 44-54.
Brouwer D.M., de Jong B.R., Soemers H.M.Jr.; Design and modeling of a six DOFs MEMS-based precision manipulator. Precision Engineering 2010; 34: 2: pp. 307-319.
Xu Qingsong, Li Yangmin; Novel Design of a Totally Decoupled Flexure-Based XYZ Parallel Micropositioning Stage; IEEE/ASME Int. Conf. on Adv. Int. Mechatronics Jul. 2010; pp. 866-871.
Seggelen J.K.v., Rosielle P.C.J.N., Schellekens P.H.J., Spaan, H.A.M., Bergmans R.H., Kotte G.J.W.L.; An Elastically Guided Machine Axis with Nanometer Repeatability; CIRP Annals—Manufacturing Technology 2005; 54: I: pp. 487-490.
Krijnen B. Brouwer D.M.; Position control of a MEMS stage with integrated sensor. Proc.11th EUSPEN Int. Conf. May 2011; 2 sheets.
Brouwer D.M., de Jong B.R., Soemers H.M.J.R., Van Dijk, J.; Sub-nanometer stable precision MEMS clamping mechanism maintaining clamp force unpowered for TEM application. J. Micromechanics and Microengineering 2006; 16: pp. S7-12.
Chang S., Wang C. S., Xiong C.Y., Fang J.; Nanoscale in-plane displacement evaluation by AFM scanning and digital image correlation processing. Nanotechnology 2005; 16: pp. 344-349.
Awtar S. Slocum A.H., Sevincer E.; Characteristics of Beam-Based Flexure Modules; Journal of Mechanical Design 2007; 129: pp. 625-639.
Hopkins J.B., Culpepper M. L.; Synthesis of precision serial flexure systems using freedom and constraint topologies (FACT); Precision Engineering 2011; 35: 4: pp. 638-649.
Brouwer D.M., Otten A., Engelen J.B.C., Krijnen B.Soemers H.M.J.R.; Long-range Elastic Guidance Mechanisms for Electrostatic Comb-drive Actuators; Proc. Euspen Int. Conf. Jun. 2010; 4 pages.
Saggere L., Kota S., Crary S.B.; A New Design for Suspension of Linear Microactuators. ASME Journal of Dynamic Systems, Measurement, and Control 1994; 2: pp. 671-675.
Jones R.V.; Instruments and Experiences; Papers on Measurement and Instrument Design; NY: Wiley; 1988; 7 sheets.
Jones R.V., Young, I.R.; Some parasitic deflexions in parallel spring movements; Downloaded from IOPscience on Oct. 5, 2013; Journal of Scientific Instruments vol. 39, Jan. 1956; pp. 11-15.
Jones, R.V.; Some uses of elasticity in instrument design; Journal of Scientific Instruments , 1962, vol. 39; pp. 193-203.
Hongzhe Zhao; Shusheng, B; Jingjun, Yu.; Design of a Family of Ultra-Precision Linear Motion Mechanisms; Journal of Mechanisms and Robotics; Copyright @2012 by ASME; Nov. 2012, vol. 4 / pp. 041012-1 thru 041012-9.
Hao Guangbo; Kong, Xianwen; Meng, Qiaoling; Design and Modelling of Spatial Compliant Parallel Mechanisms for Large Range of Translation; Proceedings of the ASAE2010 International Design Engineering Technical Conference; Aug. 15-18, 2010, Montreal,Canada DETC2010-28046; pp. 1-12.
Awtar Shorya; Synthesis and Analysis of Parallel Kinematic XY Flexure Mechanisms; Thesis; Mass Institute of Technology; Cambridge, MA; Feb. 2004; 198 pages.

\* cited by examiner

Fig. 5 Comparison of UE designs

|  | Tilted-Beam | External Linkage | Nested Linkage |
|---|---|---|---|
| Symmetry | + | - | + |
| Inertia | + | - | + |
| Range | - | + | + |
| Footprint | - | - | + |
| Kinematics | - | + | + |
| Design Decoupling | - | + | + |

Fig. 8

Static and Dynamic Performance of Bearing DOFs

|  | Double Parallelogram | | | Double Parallelogram w/ nested UE | | | Units |
|---|---|---|---|---|---|---|---|
|  | Measured | FEA | Theory | Measured | FEA | Theory |  |
| Final Stage DOF |  |  |  |  |  |  |  |
| $k_f$ | 9.76±0.25 | 9.76 | 9.98 | 10.9±1.2 | 10.5 | 10.7 | kN/mm |
| $\omega_{nf}$ | 19.1±0.1 | 20.4 | 20.6 | 20.7±0.1 | 20.5 | 21.3 | Hz |
| Intermed. Stage DOF |  |  |  |  |  |  |  |
| $k_i$ | 38.3±0.3 | 39.1 | 39.9 | 5130±190 | 4890 | 4580 | kN/mm |
| $\omega_{ni}$ | 60.4±0.3 | 68.1 | 65.8 | 650±3 | 684 | 705 | Hz |

Fig. 6

$$k_f = \frac{12E_m I_m}{L_m^3} + \left[1 + 3\left(\frac{r_1}{L_1}\right)^2 + 3\left(\frac{r_1}{L_1}\right)\right]\frac{4E_1 I_1}{L_1 d^2} + \left[1 + 3\left(\frac{r_2}{L_2}\right)^2 + 3\left(\frac{r_2}{L_2}\right)\right]\frac{2E_2 I_2}{L_2 d^2} \quad (1)$$

$$\omega_{nf} = \sqrt{\frac{k_f}{m_f + \frac{1}{4}m_i}} \quad (2)$$

$$k_i = 4\frac{12E_m I_m}{L_m^3} + 2\left[\left[\left(\frac{12E_2 I_2}{L_2^3}\cos(\theta)\right)^2 + \left(\frac{E_2 A_2}{L_2}\sin(\theta)\right)^2\right]^{-\frac{1}{2}} + \frac{L_1}{E_1 A_1}\right]^{-1} \quad (3)$$

$$\theta = \cos^{-1}\left(\frac{d + d_2}{r_2}\right)$$

$$\omega_{ni} = \sqrt{\frac{k_i}{m_i}} \quad (4)$$

UNDERCONSTRAINT ELIMINATOR MECHANISM IN DOUBLE PARALLELOGRAM LINEAR FLEXURE BEARING

RELATED APPLICATIONS

Background

1. Technical Field

This invention relates to linear flexure bearings, and more particularly to a mechanism for reducing underconstraint in double parallelogram linear flexure bearings.

2. Background Information

Throughout this application, various publications, patents and published patent applications are referred to by an identifying citation. The disclosures of the publications, patents and published patent applications referenced in this application are hereby incorporated by reference into the present disclosure.

Flexure bearings are commonly used in both macro- and micro-scale applications such as precision machinery and MEMS (MicroElectroMechanical Systems) devices, for many reasons including i) fine resolution as friction and hysteresis are minimal, ii) no backlash, iii) no power draw due to the passive nature of the components, iv) the possibility of achieving complex kinematics, v) ease of integration of low-cost high performance sensing, vi) largely linear elastomechanics, and vii) ease of fabrication at low-cost due to their often monolithic structure.

While such devices may be used to enable controlled movement in particular directions or degrees of freedom, one particularly troublesome disadvantage of conventional flexure bearings is limited range of motion.

Stacked stage designs, utilizing flexure bearings in series, are a common solution to this range limitation. One such design, also referred to as a double parallelogram flexure bearing (mechanism), is shown at 10 in FIG. 1A, and in its equivalent linkage model of FIG. 1B. Double parallelogram flexure bearing 10 effectively includes two four-bar flexure parallelograms in series to double the range of the linear bearing. As shown, this configuration is provided by an intermediate stage 12 coupled by a pair of parallel flexures 14 to ground, and by another pair of parallel flexures 16 coupled to both intermediate stage 12 and a final stage 18.

Such double parallelogram flexures are used in many applications, including single or multi-axis precision positioning stages, linear bearing elements, and in MEMS devices, etc. Double parallelogram flexure bearings have several advantages and disadvantages which must be considered when designing them.

Advantages of the serial stages include increased range and reduced parasitic kinematic errors. Serial stages will travel further than single or parallel stages, as the displacements are stacked upon one another as shown. Arcuate parasitic kinematics errors of the flexure bearings may also be cancelled out via geometry reversal to generate nearly ideal linear motion as shown by the solid arrows in the effective linkage model shown FIG. 1B. This cancellation requires that the intermediate stage traverse approximately half the final stage displacement. The cancellation effect is shown in FIG. 1B with the solid arrows showing the net movement.

Disadvantages to serial parallelogram stages include dynamic and axial stiffness issues. The intermediate stage possesses the same translational Degree of Freedom (DOF) as the final stage. This redundant DOF may cause the intermediate stage to be underconstrained because it is free to move even when the final stage is held fixed relative to ground. This underconstraint appears as an extra, uncontrolled DOF of the bearing. In many instances, this provides the underconstrained intermediate stage with a relatively low DOF resonance frequency, which tends to be on the same scale as the main translational DOF resonance of the main stage, due to the similar scale of both DOF stiffnesses.

Figure 1A:
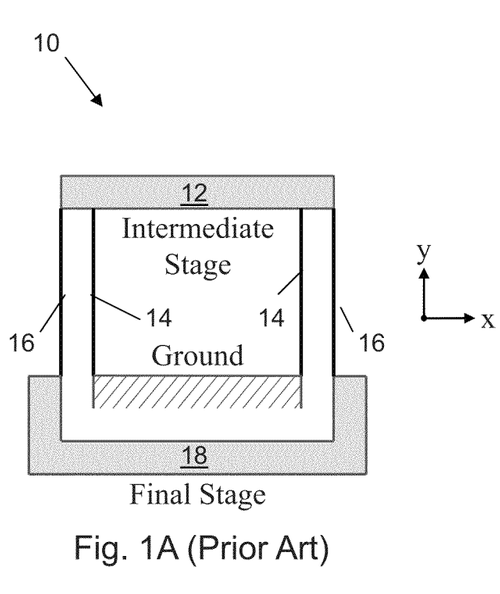
FIG. 1A is a schematic elevational view of a double parallelogram linear flexure bearing of the prior art.
Figure 1B:
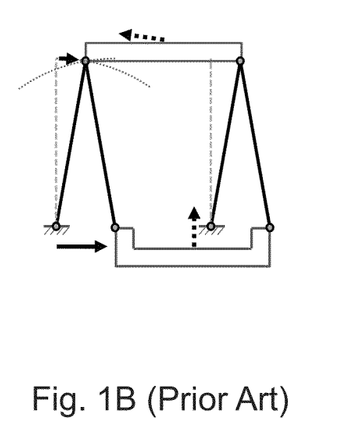
FIG. 1B is a schematic effective linkage model of representative movement of the bearing of FIG. 1A.

This underconstraint may also enable an undesired y-direction DOF for the final stage, e.g., at relatively large displacements as shown in FIG. 1B. In this regard, the intermediate stage may slide back along its arcuate trajectory towards equilibrium, allowing the final stage to translate in the y-direction, as shown with the dotted arrows. When so moving, the motion of the intermediate and final stages are no longer linked by a 2:1 ratio in this vertical DOF, as they are for the main translational DOF. It is noted that in these examples, the y-direction corresponds to axial loading on the flexures, which is a high-stiffness degree-of-constraint at low displacements. However, the axial stiffness drops dramatically at large displacements, due to the allowed motion shown by the dotted arrows.

UE (Underconstraint Eliminating) Flexure Bearings have been developed in attempts to address the issue of bearing underconstraint. However, existing linkage design solutions still present a range of disadvantages including asymmetry, static and dynamic performance losses, increased bearing footprint, parasitic kinematic error, and design coupling, all of which limit the applicability of conventional UE designs.

Figure 2A:
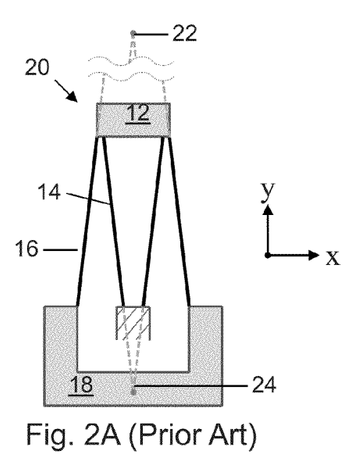
FIG. 2A is a schematic elevational view of a double tilted-beam flexure bearing of the prior art.
Figure 2B:
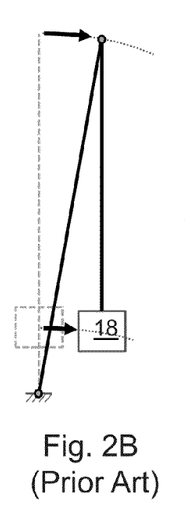
FIG. 2B is a schematic effective linkage model of representative movement the bearing of FIG. 2A.
Figure 2C:
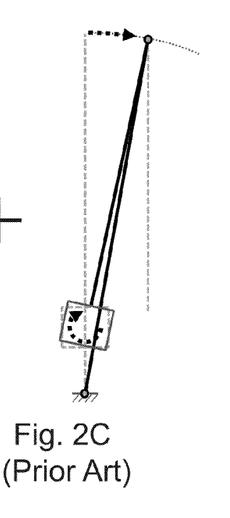
FIG. 2C is a view similar to that of FIG. 2B, of further representative movement of the bearing of FIG. 2A.

An example of a conventional UE linkage design is known as a Double Tilted-Beam Flexure Bearing, such as shown at 20 in FIG. 2A, and in its equivalent linkage models of FIGS. 2B-2C. This bearing 20 may remove underconstraint by angling the flexure beams 14, 16. This design adjusts each of the beams 14, 16 off from vertical (y-direction) by an equal angle to create two instant centers, one below and one above the bearing at 22 and 24, respectively. The two possible motions for the structure are shown in equivalent linkage models in FIGS. 2B and 2C. The solid arrows of FIG. 2B show the nominal translational motion in which the final stage 18 does not rotate. It is noted that the kinematic errors are not canceled in this translation, because the two bars 14, 16 do not carry out equivalent motions. The dotted arrows of FIG. 2C show the extra DOF of the structure in which the final stage rotates without translating. This design therefore provides a 1DOF translational bearing only if the rotation is constrained. To do so would require multiple structures, such as using two of these bearings side-by-side, thereby requiring twice the footprint. The final stage may also be left with a cosine-like error at large displacements. This approach thus poses several disadvantages, including design coupling, altered DOF and parasitic kinematics. The main translational elastomechanics may be altered by the angled beams, resulting in altered stiffness due to the combined translation and rotation in the beams. This may also reduce range due to greater stress buildup in the beams.

Figure 3A:
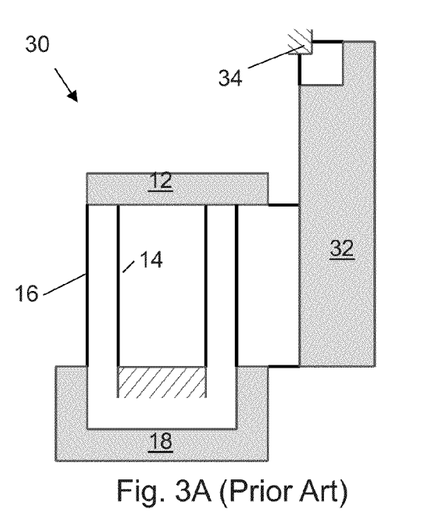
FIG. 3A is a schematic elevational view of an exact constraint folded flexure bearing of the prior art.
Figure 3B:
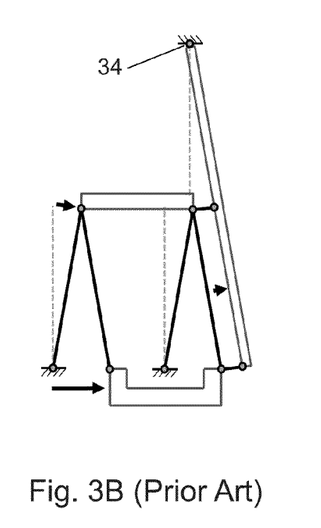
FIG. 3B is a schematic effective linkage model of representative movement of the bearing of FIG. 3A.

Turning now to FIG. 3A, an Exact Constraint Folded Flexure Bearing with external linkage, shown at 30, may also remove underconstraint. This approach uses an external linkage 32 to tie the kinematics of the intermediate stage 12 to the final stage 18. The rigid linkage 32 rotates around an instant center 34 above the bearing, shown in the equivalent linkage model in FIG. 3B. The distance from this instant center 34 to each of the stages 12, 18, sets the ratio of motion between the stages. A ratio of 1:2 ensures that the intermediate stage translates half as far as the final stage, as shown by the solid arrows in FIG. 3B. The overall bearing's underconstrained DOF is removed because the intermediate stage no longer has the freedom to move separately from the final stage. The intermediate stage is thus prevented from shifting back along its path and allowing the final stage to translate in the y-direction.

This external linkage design possesses several drawbacks including degraded dynamics, asymmetry, and increased footprint. The external linkage can significantly alter the dynamics of the main translational DOF via the asymmetric layout and the added inertia. The asymmetric layout of the bearing may also increase thermal sensitivity. The inclusion of the large linkage also roughly doubles the required bearing footprint in many applications.

A need therefore exists for an improved UE Flexure Bearing that addresses one or more of the aforementioned drawbacks.

SUMMARY

In one aspect of the present invention, a double parallelogram linear flexural mechanism includes a first stage extending in a direction of movement, and a first pair of parallelogram flexures extending transversely from the first stage and terminating at distal ends configured for being fastened to ground. A second stage extends parallel to the first stage, and a second pair of parallelogram flexures extends from the first stage to the second stage, so that the first stage, the first pair of parallelogram flexures, the second stage, and the second pair of parallelogram flexures, collectively form a double parallelogram. A linkage is disposed between, and resiliently coupled to, the first stage and the second stage. A pair of linkage guiding flexures are coupled at proximal end portions thereof, to a first end portion of the linkage, with the linkage guiding flexures extending divergently from the proximal end portions to distal end portions configured for being fastened to ground, so that the pair of linkage guiding flexures define a notional triangle having a base extending between the distal end portions, and sides extending through the proximal end portions to a notional apex, the notional apex defining an instant center of rotation for the linkage. The linkage is disposed entirely within the double parallelogram, while being configured to constrain the first stage and the second stage to oscillate in the direction of motion at the same frequency and phase.

In another aspect of the invention, a method of providing a double parallelogram linear flexural mechanism includes extending a first stage in a direction of movement, and extending a first pair of parallelogram flexures transversely from the first stage to distal ends configured for being fastened to ground. The method also includes extending a second stage parallel to the first stage, and extending a second pair of parallelogram flexures from the first stage to the second stage, so that the first stage, the first pair of parallelogram flexures, the second stage, and the second pair of parallelogram flexures, collectively form a double parallelogram. A linkage is disposed between, and resiliently coupled to, the first stage and the second stage. Proximal end portions of a pair of linkage guiding flexures are coupled to a first end portion of the linkage. The linkage guiding flexures are extended divergently from the proximal end portions to distal end portions configured for being fastened to ground. The linkage guiding flexures define a notional triangle having a base extending between the distal end portions, and sides extending through the proximal end portions to a notional apex, the notional apex defining an instant center of rotation for the linkage, wherein the linkage is disposed entirely within the double parallelogram while constraining the first stage and the second stage to oscillate in the direction of motion at the same frequency and phase.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

In the following description, for purposes of explanation, numerous specific details are set forth in order to provide a thorough understanding of the present invention. It will be evident, however, to one skilled in the art that the present invention may be practiced without these specific details.

Figure 4A:
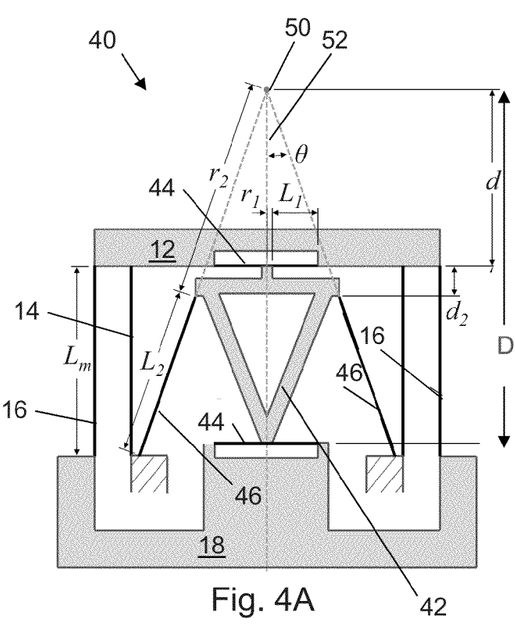
FIG. 4A is a schematic elevational view of a double parallelogram linear flexural bearing of the present invention.
Figure 4B:
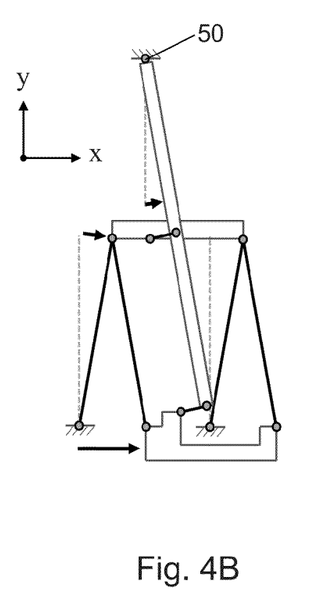
FIG. 4B is a schematic effective linkage model of representative movement of the bearing of FIG. 4A.

Briefly described, embodiments of the present invention provide an improved double parallelogram linear flexural mechanism that effectively removes undesired underconstraint in an intermediate stage. This new approach addresses many of the problems associated with conventional solutions such as static and dynamic performance losses and increased footprint. Examples have been shown to selectively eliminate underconstrained Degree-of-Freedom (DOF) in double parallelogram linear flexure bearings, while providing an 11× gain in the resonance frequency and 134× gain in static stiffness of the underconstrained DOF.

Where used in this disclosure, the term "axial" when used in connection with an element described herein, refers to a direction relative to the element, which is substantially parallel to its longitudinal dimension. For example, the axial direction of flexures 14 and 16 is parallel to the y-axis when oriented as shown in FIG. 4A. The terms "direction of movement", "desired Degree of Freedom", and "desired DOF", all refer to the desired direction of travel of one or more stages 12, 18 of embodiments of the present invention, e.g., along the x-direction as shown in FIGS. 4A, 4B. The term "transverse" refers to a direction other than substantially parallel to the direction of motion.

Referring now to the Figures, embodiments of the present invention will be described in detail. As discussed hereinabove, embodiments of the present invention include a linkage mechanism configured to selectively reduce or remove underconstraint in double parallelogram linear flexure bearings. An embodiment of this improved linkage mechanism, as shown in FIG. 4A, provides similar or improved performance while avoiding many of the limitations associated with prior art UE devices. Embodiments may thus be used in a wider range of machine designs than existing UEs, and/or serve as performance-enhanced replacements for conventional UE devices. Performance enhancements of these embodiments may include increased range, dynamic stability, and bandwidth, in conjunction with reductions in footprint and parasitic kinematic error.

Turning now to FIG. 4A, UE flexure mechanism 40 is similar in some respects to the Exact Constraint Folded Flexure Bearing 30 described above with respect to FIGS. 3A-3B, while being modified to include a nested linkage 42. This mechanism 40, including its nested linkage, addresses drawbacks associated with the use of an external linkage design, such as by providing improved dynamics, symmetry and footprint.

As shown, mechanism 40 includes an intermediate stage 12 coupled by a pair of parallel (also referred to as parallelogram) flexures 14 to ground, and by another pair of parallel flexures 16 to a final stage 18. In particular embodiments, the stages 12, 18 are rigid bodies, and, along with flexures 14, 16, effectively form a double parallelogram. It is also noted that in particular embodiments, flexures 14 extend parallel to flexures 16 when in their rest positions, as shown. It should be recognized, however, that flexures 14 and/or 16 may extend obliquely from the stages when at rest, without departing from the scope of the present invention.

Nested linkage 42 is a substantially rigid body that is centrally disposed between, and resiliently coupled to, each of the stages 12, 18. This resilient coupling may be provided by blade flexures 44 which extend substantially parallel to the desired DOF of the stages, i.e., along the x-axis as shown. While such blade flexures are desirable for various applications, it should be recognized that substantially any resilient coupling capable of resisting motion of the linkage in the desired DOF, while permitting the linkage to move in other directions, e.g., pivotably relative to the stages, may be used.

As also shown, nested linkage 42 is coupled to ground by a pair of linkage guiding flexures 46. In the embodiment shown, proximal ends of guiding flexures 46 are coupled to the linkage 42 at a point on the linkage located proximate the intermediate stage 12, i.e., at a point closer to the intermediate stage 12, than to the final stage 18. In particular embodiments, it may be desired to couple the flexures 46 within the first third of the distance d from stage 12 to stage 18, as shown. For convenient description, flexures 44 may be referred to herein as 'type 1' flexures, while flexures 46 may be referred to as 'type 2' flexures.

As also shown, in particular embodiments, the guiding flexures 46 extend divergently from linkage 42, to distal end portions configured for being fastened to ground. The guiding flexures 46 thus define a notional triangle having a base extending between the distal end portions, and having sides that extend through the proximal end portions of flexures 46 to a notional apex 50. The notional apex 50 defines the instant center of rotation for the linkage 42.

In particular embodiments, the instant center (apex) 50 is disposed along a plane of symmetry 52 of the stage 12, the plane of symmetry 52 extending orthogonally (e.g., along the y-axis) to the desired DOF. The final stage 18 and the linkage 42 also may be symmetrical about the plane of symmetry 52, with the flexures 14, 16, 44 and 46 spaced or otherwise oriented symmetrically about the plane of symmetry 52 as shown, to help avoid buckling, thermal sensitivity, and dynamic issues.

This configuration provides the linkage 42, and the overall flexure 40, with an instant center 50 placed along the plane of symmetry 52, which improves the dynamics and symmetry of the structure relative to the prior art. It should be noted that the linkage guiding flexures 46 do not need to extend all the way to the instant center 50. Rather, as discussed above, these flexures 46, and the linkage 42, may be configured to nest within the space between the stages 12, 18. The linkage 42 may be disposed entirely within the double parallelogram formed by the stages 12, 18, and the flexures 14, 16, as shown, to reduce the footprint and inertia of flexure 40. Moreover, as mentioned above, linkage 42 is essentially a rigid body, and may be hollowed out, leaving a truss-like structure, as shown, that further minimizes inertia to further improve dynamics. This configuration provides these benefits while advantageously constraining both stages 12 and 18 to oscillate in the desired DOF (parallel to the x-axis as shown) at a common frequency and phase with one another. Moreover, it should be recognized that although the flexures 14, 16, 44 and 46 may be formed monolithically with the stages and linkage, other types of flexure construction may be used, depending on the requirements of particular applications. For example, flexures 44 may be replaced with wire flexures to avoid overconstraining the mechanism 40 in particular applications.

The possible motion for the mechanism 40 is shown in the equivalent linkage model of FIG. 4B. The solid arrows show the nominal translational motion, which is equivalent to the desired translational motion of an otherwise similar double parallelogram flexure bearing 10 (FIGS. 1A, 1B), as described hereinabove. In addition, the linkage 42 provides the benefits of external linkage 32 of FIGS. 3A and 3B, i.e., of effectively tying the kinematics of the intermediate stage 12 to the final stage 18, to ensure that both stages move at the same frequency and phase. The rigid linkage 42 rotates around instant center 50. The distance from instant center 50 to each of the stages 12 (distance d), and 18 (distance D), sets the ratio of motion between the stages. In the embodiment shown, this ratio of d:D is fixed at 1:2, to ensure that the intermediate stage 12 translates half as far as the final stage 18, as shown by the solid arrows in FIG. 4B. The linkage 42 thus effectively removes the underconstraint DOF described above with respect to mechanism 10 of FIGS. 1A, 1B, because the intermediate stage 12 no longer has the freedom to move independently of final stage 18. The 1:2 motion prescribed by linkage 42 prohibits the intermediate stage 12 from cycling back along its path before stage 18 cycles back, to ensure that both stages move at the same frequency and phase. Such constraint substantially prevents the stage 18 from undesirably translating in the y-direction as shown and described with respect to flexure 10. Moreover, linkage 42 provides this benefit without the various drawbacks of external linkage 32, such as degraded dynamics, asymmetry, and increased footprint, etc.

It should be noted that the configuration shown in FIG. 4A is merely representative, and that variations and adjustments may be made depending on the particular application, without departing from the scope of the present invention. For example, linkage 42 is shown as contacting stages 12 and 18 at substantially the same height in the direction transverse to the DOF of the stages (i.e., along the y-axis in the embodiment shown) as flexures 14, 16. However, linkage 42 may contact the stages 12, 18 at substantially any height relative to that of flexures 14, 16, e.g., to shift the location of instant center 50. For example, the height of linkage 42 may be reduced relative to that of flexures 14, 16, simply by extending the central portions of stages 12, 18 towards one another. This will effectively lower the height of instant center 50 to increase the angle θ at which the flexures 46 are oriented.

The three UE approaches described hereinabove, i) tilted-beam 20 (FIG. 2A), ii) external linkage 30 (FIG. 3A), and iii) the improved nested linkage 40 of the present invention (FIG. 4A), all help eliminate the underconstraint in a double parallelogram flexure bearing. They may also all increase the displaced axial stiffness (y-direction) of the final stage and raise the resonance frequency associated with the underconstrained element. However, the inventive mechanism 40 provides significant additional benefits, such as shown in the comparison table of FIG. 5.

Figure 5:
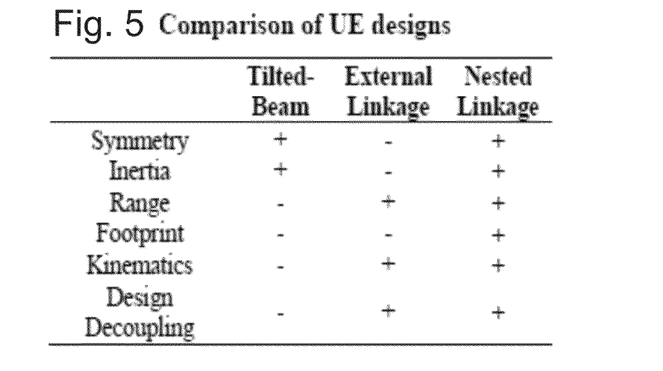
FIG. 5 is a Table comparing aspects of the bearings of FIGS. 2A, 3A and 4A.

As shown in FIG. 5, the double tilted-beam (e.g., 20, FIG. 2A) provides symmetry and relatively low inertia due to its simplicity. However, it must be used in duplicate, resulting in a relatively large footprint as described above. The range is relatively low due to the beam angle as described above, and the main translational DOF will have parasitic kinematics as shown in FIG. 2C.

The external linkage configuration (e.g., 30, FIG. 3A) breaks the bearing symmetry, and has relatively high inertia and footprint. The range, kinematics, and design of the main DOF are unaltered by the external linkage design.

The improved nested linkage configuration (e.g., 40, FIG. 4A) maintains symmetry, low inertia and footprint via a small linkage nested within the double parallelogram. The range, kinematics, and design of the main DOF are also unaltered by the nested linkage design. These aspects provide the nested linkage approach with improved performance over the other two conventional approaches.

Having described an embodiment of the present invention, the following aspects may be selectively of particular significance to particular applications. For example, in particular embodiments, the nested linkage 42 should be coupled to stages 12, 18, and to ground, in order to kinematically link the stages 12, 18 for movement at common frequency and phase. As discussed above, the points of contact of the linkage 42 to each of the stages may be at any distance from one another, i.e., linkage 42 does not need to engage the stages at the same height (e.g., along the y-axis) as the ends of the main flexures 14, 16. By moving these points of contact relative to one another, the location of the instant center 50, and therefore the splay angle of flexures 46, is shifted, which affects the stiffness of the flexures when resisting the translational DOF of stage 12. It is noted that in particular embodiments, flexures 46 will need to displace roughly as much as the main flexures 14, 16. Flexures 46 may be thinner than the main flexures 14, 16 in order to avoid significantly altering the main (desired) translational DOF, so that flexures 46 will see lower stresses than the main flexures, typically without changing the range of the overall flexure bearing.

Various parameters of mechanism 40 may be adjusted as desired for particular applications. For example, it may be desired to configure the mechanism 40 based on a particular translational DOF stiffness, and then see what improvement is possible in the underconstraint stiffness/resonance. Alternately, it may be desired to boost the underconstrained DOF stiffness/resonance to some target value, and then see what effect this has on the main translational DOF. The equations required to calculate these tradeoffs in either direction are shown as Equations (1)-(4) of FIG. 6.

Final Stage DOF

Figure 6:
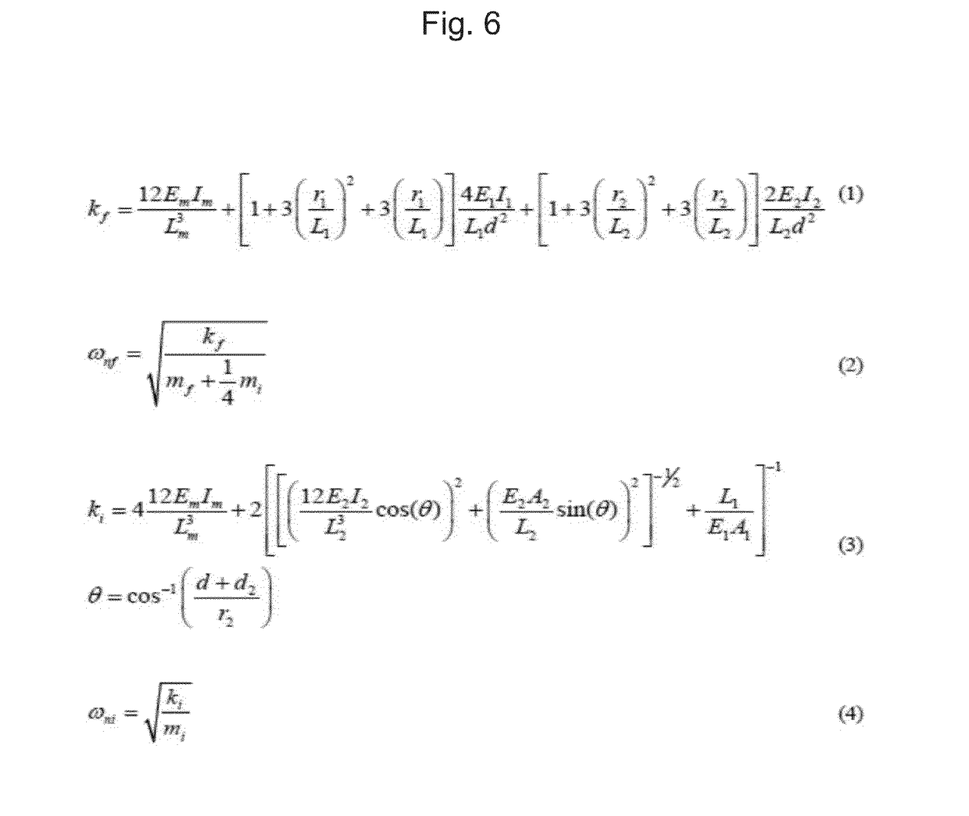
FIG. 6 is a table of equations pertaining to the bearing of FIG. 4A.

The linear stiffness, $k_f$, of the final stage along the main x-axis translational DOF is shown in Eq. (1), where $r_1$ is the lever arm for the type 1 flexures 44, $r_2$ is the lever arm for the type 2 flexures 46, and d is the separation (e.g., along the y-axis as shown) between the linkage points to the stages. These variables are identified in FIG. 4A. E, I and L are the Young's modulus, second moment of area, and length respectively of the main flexures 14, 16, type 1 flexures 44 and type 2 flexures 46.

The first term in Eq. (1) contains the contribution from the main flexural double parallelogram. The second term describes the combined rotation/translation of the four type 1 flexures 44, while the third term describes the combined rotation/translation of the two type 2 flexures 46. The ratio $r_1/L_1 \approx 0$, as the type 1 flexures are placed as close to the plane of symmetry as possible. The ratio $r_2/L_2 1$, as the type 2 flexures are generally extended to be as long as possible within the constrained space, bringing $L_2 \approx d$.

The resonance of the final stage, $\omega_{nf}$, is shown in Eq. (2), where $m_f$ is the mass of the final stage and $m_i$ is the mass of the intermediate stage. The intermediate stage mass is scaled down via a 1:2 transmission ratio.

Intermediate Stage DOF

The linear stiffness, $k_i$, of the intermediate stage along the x-axis underconstrained DOF is shown in Eq. (3), where $d_2$ is the vertical (y-axis) separation between the end of the type 2 flexures and the intermediate stage linkage point, θ is the angle of the type 2 flexures off of vertical, and A is the cross-sectional area of the type 1 and type 2 flexures.

The first term contains the contribution from the double parallelogram when the final stage is locked, and the second term contains the semi-axial loading of the type 2 flexures in series with the axial loading of the type 1 flexures. The type 1 flexures are typically stiffer, but not so much as to justify completely removing from the expression. The type 2 flexure stiffness transitions at large θ from that of transverse bending to that of axial loading, increasing the stiffness of the translational DOF of the intermediate stage. The angle θ is increased by lowering d. The resonance of the intermediate stage, $\omega_{ni}$, is shown in Eq. (4). This expression assumes that the final stage mass is locked in place for simplicity.

Figure 7:
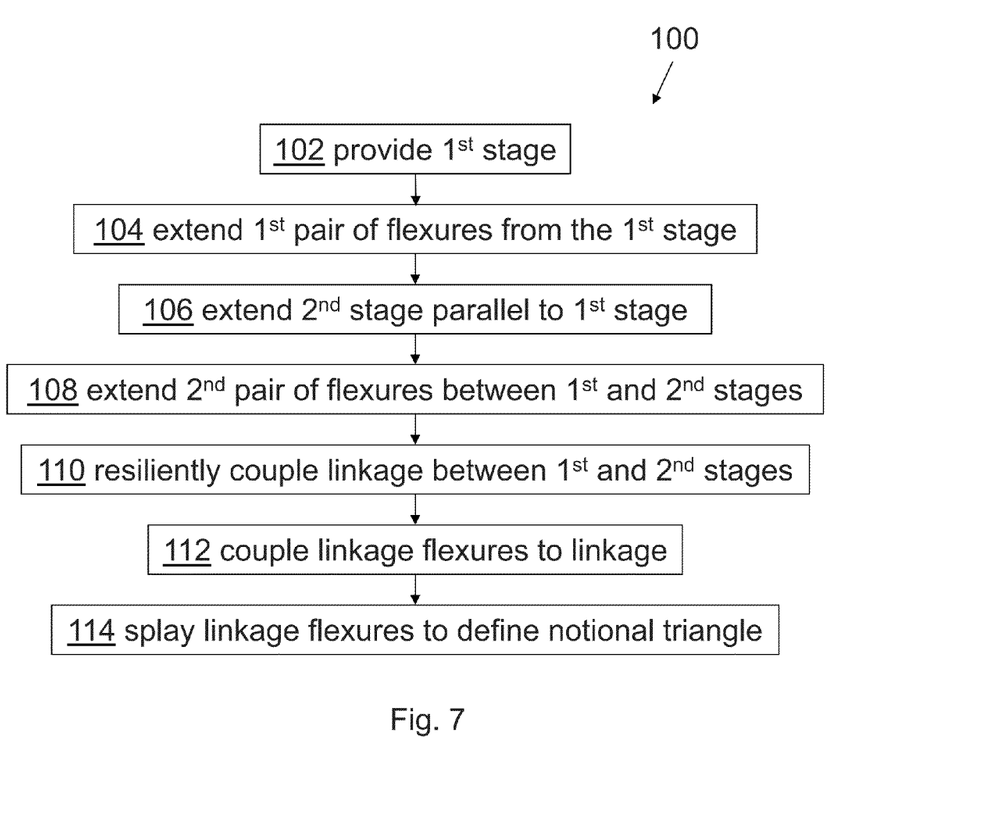
FIG. 7 is a flowchart of an exemplary method of the present invention.

Having described an exemplary flexure mechanism of the present invention, the following is a description of a method of designing, or otherwise providing, such a flexure mechanism. Turning now to FIG. 7, a method 100 of providing a double parallelogram linear flexural mechanism includes extending 102 a first stage in a direction of movement, extending 104 a first pair of parallelogram flexures transversely from the first stage to distal ends configured for being fastened to ground, and extending 106 a second stage parallel to the first stage. At 108, a second pair of parallelogram flexures is extended from the first stage to the second stage, wherein the first stage, the first pair of parallelogram flexures, the second stage, and the second pair of parallelogram flexures, collectively form a double parallelogram. At 110, a linkage is disposed between, and resiliently coupled to, the first stage and the second stage. The method further includes coupling 112 proximal end portions of a pair of linkage guiding flexures to a first end portion of the linkage, and extending 114 the linkage guiding flexures divergently from the proximal end portions to distal end portions configured for being fastened to ground, wherein the pair of linkage guiding flexures are configured to define a notional triangle having a base extending between the distal end portions, and sides extending through the proximal end portions to a notional apex, the notional apex defining an instant center of rotation for the linkage, and wherein the linkage is disposed entirely within the double parallelogram while constraining the first stage and the second stage to oscillate in the direction of motion at the same frequency and phase.

The following illustrative examples demonstrate certain aspects and embodiments of the present invention, and are not intended to limit the present invention to any one particular embodiment or set of features.

EXAMPLES

Meso-scale (30 cm×30 cm) double parallelogram flexures with and without the nested UE linkage 42, such as shown in FIGS. 4A and 1A, respectively, were monolithically fabricated from 1.27 cm thick aluminum using abrasive waterjet cutting. The double parallelogram flexures 14, 16 were the same for both flexure bearings. These four flexures were 2.25 mm wide and 100 mm long, and the inner set were separated by 224 mm. The nested UE linkage was intended to boost the natural frequency of the translational DOF of the intermediate stage by around 10× with only minimal (<10%) alterations to the main DOF static and dynamic performance. The type 1 flexures 44 in the UE were 0.75 mm wide and 60 mm long with a lever arm, $r_1$, of 2.5 mm. The type 2 flexures 46 were 0.75 mm wide, 107 mm long and at an angle θ (FIG. 4A) of 27.9° off of vertical with a lever arm, $r_2$, of 119 mm. The separation d, between the points of contact of linkage 42 with the stages 12, 18, was 100 mm. The vertical (y-axis) separation $d_2$ between the ungrounded end of the type 2 flexures 46 and the point of contact of the linkage 42 with the intermediate stage 12, was 5.25 mm. The mass of intermediate stage 12 was 0.234 kg, and the mass of final stage 18 was 0.538 kg. The linkage 42 was fabricated as a triangular truss structure, each leg of the triangle having a width of about 8 mm, which was sufficient to provide sufficient rigidity that the body deformations were negligible.

The flexure bearings were anchored to an optical table and the static/dynamic performance of both the final and intermediate stage translational DOFs was measured. Static tests were performed with weights for loading and Lion Precision capacitance probes for sensing. Dynamic tests were performed with impulse loading and the same sensors sampling at 50 khz. A metal hammer was used to drive the axis of interest. The Fourier transform of the impulse response was scaled to unity at low frequency in order to normalize the plots. This captures the dynamic component of the transfer function, with the static stiffness gain term removed. A second order decaying sinusoid was fit to the capacitance probe readings of the impulse response in order to determine the resonance frequency. The final stage was anchored during the intermediate stage measurements.

RESULTS

Figure 8:
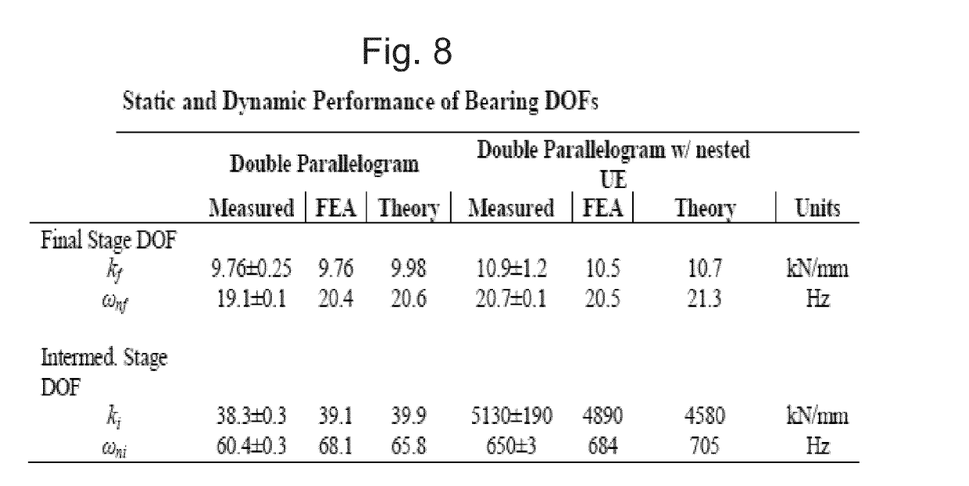
FIG. 8 is a Table comparing static and dynamic performance of examples of the bearings of FIGS. 1A and 4A.

The static and dynamic performance of the main translational DOF and the intermediate stage translational DOF for both flexures is shown in the table of FIG. 8. Measurements were compared against FEA (finite element analysis) predictions and theoretical predictions from the equations described hereinabove.

As expected, the main translational DOF shows minimal changes in both static (12%) and dynamic (8%) performance due to the addition of the nested linkage 42. It was also noted that the dynamic change is partially cancelled as both the stiffness and inertia rise. However, as desired, the intermediate stage DOF shows significant changes in both static (134×) and dynamic (11×) performance. The measurements confirm that the both the FEA (average 4%) and the analytical model (average 6%) are sufficiently accurate for use as flexural geometry design tools.

Figure 9:
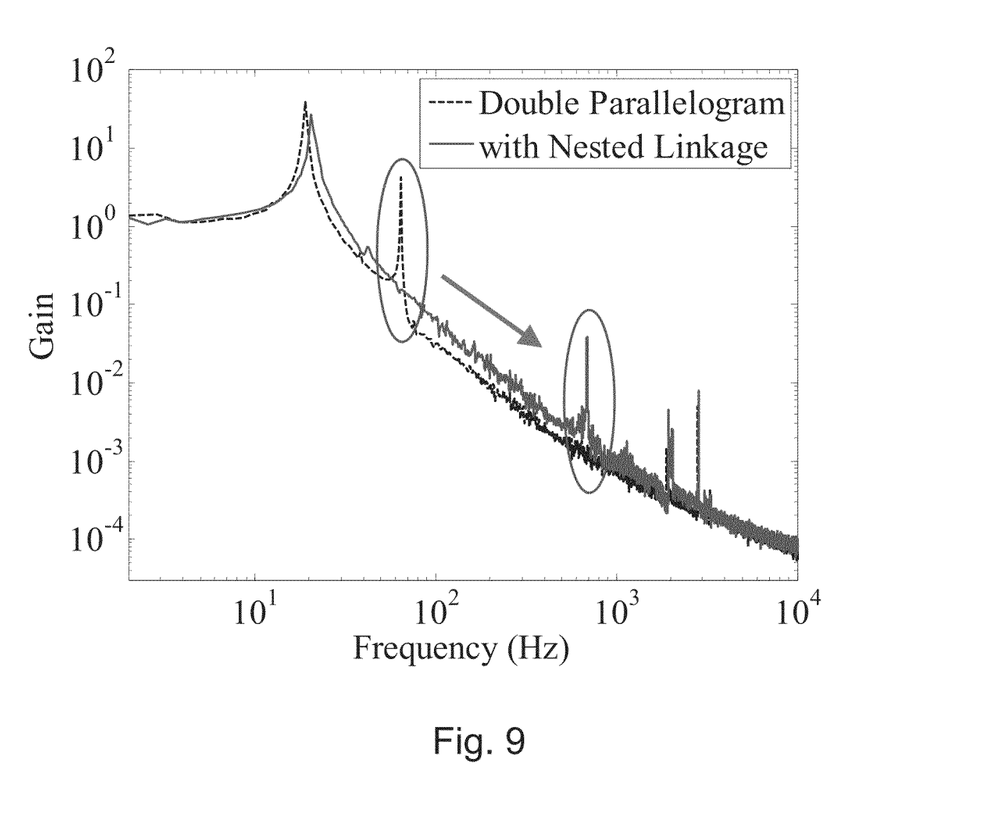
FIG. 9 is a Bode plot of the performance of examples of the bearings of FIGS. 1A and 4A.

Bode gain plots for both flexures are shown in FIG. 9, which indicates that the intermediate stage resonance of the inventive flexure has been advantageously raised about 10×, from about 60 hz to about 650 hz, without significantly impacting the dynamics of the main DOF.

CONCLUSIONS

Aspects of the present invention provide an improved flexure linkage design for selectively removing underconstraint in a double parallelogram linear flexural bearing. The inventive approach addresses many of the problems associated with existing solutions, such as static/dynamic performance degradation, increased footprint, etc., which limit the applicability of underconstraint elimination designs in flexural bearings. An example of the inventive approach was shown to operate within 6% error of predictions generated by first order analytical models, and was shown to boost the stiffness (134×) and resonance (11×) of the translational DOF of the intermediate stage without significantly impacting the main translational DOF of the final stage. This design topology is readily implemented in existing structures owing to its compact structure and well modeled performance.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. A double parallelogram linear flexural mechanism comprising:
   a first stage extending in a direction of movement;

a first pair of parallelogram flexures extending transversely from the first stage and terminating at distal ends configured for being fastened to ground;

a second stage extending parallel to the first stage;

a second pair of parallelogram flexures extending from the first stage to the second stage;

the first stage, the first pair of parallelogram flexures, the second stage, and the second pair of parallelogram flexures, collectively forming a double parallelogram;

a linkage disposed between, and resiliently coupled to, the first stage and the second stage;

a pair of linkage guiding flexures coupled at proximal end portions thereof, to a first end portion of the linkage;

the linkage guiding flexures extending divergently from said proximal end portions to distal end portions configured for being fastened to ground; and the pair of linkage guiding flexures defining a notional triangle having a base extending between the distal end portions, and sides extending through the proximal end portions to a notional apex, the notional apex defining an instant center of rotation for the linkage;

wherein the linkage is disposed entirely within the double parallelogram, while being configured to constrain the first stage and the second stage to oscillate in the direction of motion at the same frequency and phase.

2. The mechanism of claim 1, wherein the first pair of parallelogram flexures extend parallel to one another.

3. The mechanism of claim 2, wherein the second pair of parallelogram flexures extend parallel to one another.

4. The mechanism of claim 3, wherein the first pair of parallelogram flexures extend parallel to the second pair of parallelogram flexures.

5. The mechanism of claim 4, wherein the linkage guiding flexures extend obliquely relative to the first and second parallelogram flexures.

6. The mechanism of claim 1, wherein the first end portion of the linkage is disposed closer to the first stage than to the second stage.

7. The mechanism of claim 6, wherein the first end portion of the linkage is disposed within a first third of the distance from the first stage to the second stage.

8. The mechanism of claim 1, wherein the instant center is disposed along a plane of symmetry of the first stage and which extends in a direction transverse to the direction of movement.

9. The mechanism of claim 8, wherein the second stage and the linkage are both symmetrical about said plane of symmetry.

10. The mechanism of claim 9, wherein the pairs of parallelogram flexures and the pair of linkage guiding flexures are disposed symmetrically about said plane of symmetry.

11. The mechanism of claim 1, wherein the first stage, the second stage, and the linkage, are all rigid bodies.

12. The mechanism of claim 11, wherein the mechanism is monolithic.

13. The mechanism of claim 1, wherein the linkage is configured for rotational motion about the instant center.

14. The mechanism of claim 1, wherein the linkage is resiliently coupled to the first stage and to the second stage by a plurality of coupling flexures.

15. The mechanism of claim 14, wherein the coupling flexures are configured to resist motion in the direction of movement, while permitting the linkage to move in other directions.

16. The mechanism of claim 15, wherein the coupling flexures are configured to permit the linkage to pivot relative to the first stage and relative to the second stage.

17. The mechanism of claim 14, wherein the coupling flexures extend parallel to the direction of movement.

18. The mechanism of claim 14, wherein one or more of the plurality of coupling flexures comprise wire flexures.

19. A method of providing a double parallelogram linear flexural mechanism, the method comprising:

extending a first stage in a direction of movement;

extending a first pair of parallelogram flexures transversely from the first stage to distal ends configured for being fastened to ground;

extending a second stage parallel to the first stage;

extending a second pair of parallelogram flexures from the first stage to the second stage, wherein the first stage, the first pair of parallelogram flexures, the second stage, and the second pair of parallelogram flexures, collectively form a double parallelogram;

disposing a linkage between, and resiliently coupled to, the first stage and the second stage;

coupling proximal end portions of a pair of linkage guiding flexures to a first end portion of the linkage; and extending the linkage guiding flexures divergently from the proximal end portions to distal end portions configured for being fastened to ground;

wherein the pair of linkage guiding flexures define a notional triangle having a base extending between the distal end portions, and sides extending through the proximal end portions to a notional apex, the notional apex defining an instant center of rotation for the linkage; and wherein the linkage is disposed entirely within the double parallelogram while constraining the first stage and the second stage to oscillate in the direction of motion at the same frequency and phase.

* * * * *